(12) United States Patent
Cao et al.

(10) Patent No.: US 11,581,571 B2
(45) Date of Patent: Feb. 14, 2023

(54) METHOD FOR IMPROVING PERFORMANCE OF LAYERED ELECTRODE MATERIALS

(71) Applicant: Huazhong University of Science and Technology, Hubei (CN)

(72) Inventors: Yuancheng Cao, Hubei (CN); Yaqing Guo, Hubei (CN); Shun Tang, Hubei (CN)

(73) Assignee: WUHAN RIKOMAY NEW ENERGY CO., LTD., Wuhan (CN)

( * ) Notice: Subject to any disclaimer, the term of this patent is extended or adjusted under 35 U.S.C. 154(b) by 24 days.

(21) Appl. No.: 17/244,634

(22) Filed: Apr. 29, 2021

(65) Prior Publication Data

US 2021/0320319 A1   Oct. 14, 2021

(51) Int. Cl.
  *H01M 4/04*    (2006.01)
  *H01M 10/056*  (2010.01)
  *H01M 4/50*    (2010.01)
  *H01M 4/02*    (2006.01)

(52) U.S. Cl.
  CPC .......... *H01M 10/056* (2013.01); *H01M 4/50* (2013.01); *H01M 2004/021* (2013.01); *H01M 2004/028* (2013.01); *H01M 2300/0028* (2013.01)

(58) Field of Classification Search
  CPC ............................................. H01M 2300/0028
  See application file for complete search history.

(56) References Cited

U.S. PATENT DOCUMENTS

2020/0395606 A1 *  12/2020  Adams ................. H01M 4/366

FOREIGN PATENT DOCUMENTS

| CN | 103985902 A | 8/2014 |
| CN | 108470633 A | 8/2018 |
| CN | 109761276 A | 5/2019 |

OTHER PUBLICATIONS

WebElements Periodic Table Caesium: radii of atoms and ions(www.webelements.com/caesium/atom_sizes.html).*
Information for Teachers (http://butane.chem.uiuc.edu/pshapley/Enlist/Labs/WaterStruc/Teachers.html).*

* cited by examiner

*Primary Examiner* — Austin Murata

(57) ABSTRACT

Disclosed is a method for improving the performance of a layered electrode material. An interlayer spacing of the layered electrode material is measured and donated as (b). A salt compound is selected and added into a solvent with a molecular diameter of (c) to prepare an electrolytic solution, where a diameter (a) of a cation in the salt compound is smaller than the interlayer spacing (b), and c>b−a. The electrolytic solution is used as the working electrolytic solution for the layered electrode material.

10 Claims, 20 Drawing Sheets

METHOD FOR IMPROVING PERFORMANCE OF LAYERED ELECTRODE MATERIALS

CROSS-REFERENCE TO RELATED APPLICATIONS

This application claims the benefit of priority from Chinese Patent Application No. 202010353089.5, filed on Apr. 29, 2020. The content of the aforementioned application, including any intervening amendments thereto, is incorporated herein by reference.

TECHNICAL FIELD

The present application relates to performance improvement of layered electrode materials, and more particularly to a method for improving performance of layered electrode materials.

BACKGROUND

Layered electrode materials are increasingly used in energy storage devices such as batteries and capacitors owing to their advantages of high specific capacity, low resistance and high energy density, and properties of double-layer capacitance and Faraday pseudocapacitance. In the practical use, cations in the electrolytic solutions undergo intercalation and deintercalation in the layered electrode materials to realize the charging and discharging process. During the cycle of charging and discharging, the layered electrode material will go through structural transformations from a layered structure to a defective spinel structure to a disordered rock salt structure, which will bring a decreased interlayer spacing, an increased impedance and a non-uniform surface-bulk structure, rendering the intercalation and the deintercalation of cations more difficult, or even impossible. As a consequence, an obvious deterioration will occur to the specific capacity and cyclic stability.

Thus, the intercalation and the deintercalation of cations have a great influence on the specific capacity and the cyclic performance of energy storage devices, and performances of the energy storage devices can be improved by decreasing the resistance in the process of intercalation and the deintercalation of cations. Currently, most research concerning layered electrode materials is focused on performance analysis and enhancement, while the failure mechanism of layered electrode materials has not been studied thoroughly. Therefore, to deeply explore the relationship between the crystal structure of the layered materials and the co-intercalating behavior of solutes and solvents in electrolytic solutions, and the intercalation and the deintercalation of solvated/desolated ion, can provide technical reference for the performance improvement of energy storage materials and the development of a green and efficient route of recycling energy storage materials.

It has been found that during the intercalation and the deintercalation processes of cations in electrolytic solutions, if the cationic diameter differs greatly from the interlayer spacing, the cations often intercalate into or deintercalate out of the layered material in a form of hydrated ions, and the intercalation of water molecules is detrimental to the specific capacity and cyclic performance of the layered electrode materials. If the cationic diameter is larger and differs slightly from the interlayer spacing, the solvent molecules would be not prone to intercalating into the layered electrode material, so that the desolvation effect would be enhanced, and the specific capacity and cyclic performance would be improved correspondingly. If the cationic diameter is larger than the interlayer spacing, it will be difficult for cations to intercalate into the layered electrode materials, and the layered structure is prone to collapse, resulting in poor performance.

Chinese Patent Publication No. 103985902A discloses a method for improving the performance of lithium-sulfur batteries by using a desolvated gel electrolyte, where the desolvated gel electrolyte has high concentration of lithium hexafluorophosphate and a carbonate solvent, which can reduce the impedance of the electrolysis through the desolvation effect, leading to an improved electrochemical performance.

Given the above, the present disclosure provides a method for improving the performance of a layered electrode material, in which the interlayer spacing, cationic diameter and solvent molecular diameter are regulated to enhance the desolvation effect to make the solvent molecules fail to intercalate into the interlayer of the layered electrode material, so as to optimize the working electrolyte for the layered electrode material, leading to significantly improved specific capacity and cyclic performance of the layer electrode materials.

SUMMARY

An object of this application is to provide a method for improving performance of layered electrode materials, in which the interlayer spacing of the layered electrode materials, the cationic diameter and the solvent molecular diameter are regulated to optimize the working electrolyte for the layered electrode materials, so as to improve the specific capacity and cyclic performance of the layer electrode materials.

To achieve the above-mentioned object, this disclosure provides a method for improving performance of a layered electrode material, comprising:

(S1) measuring an interlayer spacing b of the layered electrode material;

(S2) adding a salt compound into a solvent with a molecular diameter of c to prepare an electrolyte; wherein a diameter of a cation of the salt compound is a, which is less than the interlayer spacing b; and $c > b - a$; and (S3) applying the electrolyte obtained in step (S2) as a working electrolyte for the layered electrode material to improve specific capacity and cyclic performance of the layered electrode material.

In some embodiments, the salt compound in the step (S2) is selected from the group consisting of sulphate, phosphate, carbonate, nitrate and chloride of a metallic cation and ammonium ion, a quaternary ammonium salt and a combination thereof.

In some embodiments, the metallic cation is selected from the group consisting of lithium ion, sodium ion, potassium ion, niobium ion, cesium ion and a combination thereof; and the quaternary ammonium salt is tetramethylammonium chloride, tetraethylammonium chloride, or a combination thereof.

In some embodiments, when the slat compound is a mixture, a diameter a of a cation of any one of salts in the mixture satisfies $c > b - a$.

In some embodiments, the solvent in step (S2) is water, an organic solvent, or a mixture thereof.

In some embodiments, the organic solvent is selected from the group consisting of carbonate, acetonitrile, dimethyl sulfoxide, 1,4-butyrolactone, dimethyl tetrahydrofuran, tetrahydrofuran, 1,3-dioxycyclopentane, 1,2-dimethoxyethane and a combination thereof.

In some embodiments, the carbonate is selected from the group consisting of vinyl carbonate, propylene carbonate, 2,3-butylene carbonate, dimethyl carbonate, diethyl carbonate, dipropyl carbonate, dibutyl carbonate, methyl ethyl carbonate and a combination thereof.

In some embodiments, the solvent is a mixture, and a molecular diameter c of any one of the mixture satisfies c>b−a.

In some embodiments, in step (S2), a concentration of the electrolyte is 0.2-1 mol/L.

In some embodiments, the layered electrode material is selected from the group consisting of a nickel-based layered material, a titanium-based layered material, a cobalt-based layered material, a manganese-based layered material, graphene and a graphene derivative.

In some embodiments, the layered electrode material is selected from the group consisting of layered manganese dioxide, layered lithium cobalt oxide, layered lithium nickelate, layered lithium manganate, layered lithium nickel manganese oxide, layered titanium carbide and grapheme.

In some embodiments, in step (S1), the interlayer spacing b of the layered electrode material is measured by X-ray diffraction (XRD), scanning electron microscopy (SEM), transmission electron microscopy (TEM), or a combination thereof.

Compared to the prior art, this application has the following advantages.

1. In the method provided herein, the interlayer spacing of the layered electrode material is measured, and then an appropriate salt compound and solvent are selected to prepare an electrolytic solution as the optimal working electrolyte for the layer electrode material, where the molecular diameter of the solvent is larger than the difference between the interlayer spacing and the diameter of cation in the salt compound. In the use of this electrolyte, the layer electrode material shows a high capacity and good cyclic stability during the charging/discharging processes. Therefore, this disclosure can prepare an optimal electrolyte for the layered electrode material only by regulating the diameters of cations and solvent molecules in the electrolytic solution, and the optimal electrolyte facilitates improving the specific capacity and cyclic performance of the layered electrode material. This method has good universality, and can significantly improve the application value of the layered materials.

2. The method provided herein can obtain a relational expression among the interlayer spacing of the layered electrode material, the cationic diameter and the solvent molecular diameter by exploring the intercalation/co-intercalation features of different cations and solvent molecules into the layered electrode material and their effects on the specific capacity and cyclic performance of the layered electrode materials. An optimal working electrolyte can be formulated quickly and accurately for any layer electrode material through the above-mentioned relational expression, thus the performance and advantages of the layer electrode materials can be fully used, providing more choices for the application of layer electrode material.

3. The method provided herein has reasonable design, simple operation and high feasibility, and has good universality in improving the performance of layered electrode materials. Moreover, the cations and solvent in the electrolytic solution can be selected based on quantitative calculation, which can accurately improve the specific capacity and cyclic performance of layered electrode materials and expand the selection of high-performance layered electrode materials and electrolytic solutions, thus enhancing the application range and value of layered materials.

DETAILED DESCRIPTION OF EMBODIMENTS

Figure 1A:
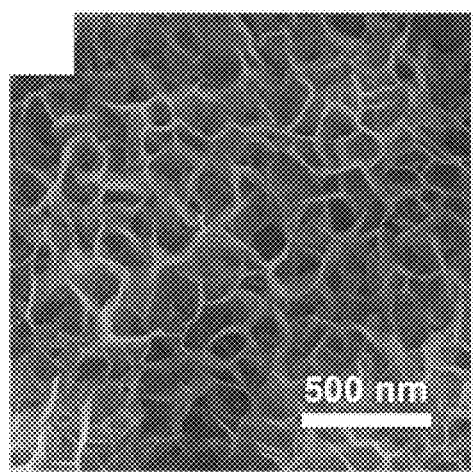
FIG. 1a is an SEM image of layered manganese dioxide.

The technical solutions of this disclosure will be clearly and completely described below with reference to the embodiments. Obviously, the following embodiments are merely some embodiments of the disclosure, and are not intended to limit the disclosure. Any other embodiments made by those skilled in the art based on the embodiments disclosed herein without paying any creative effort should fall within the scope of the disclosure.

The research and theoretical basis of the method provided herein for improving the performance of layered electrode materials are described as follows.

Based on the intercalation/co-intercalation characteristics of cations with different diameters into the layered electrode materials, the ionic states of intercalated cations (mainly characterized by hydration energy to determine whether the intercalation of water molecules occurs) and the lattice information of the layered electrode materials intercalated with cations can be theoretically calculated. The mechanism of intercalation and de-intercalation of cations can be obtained by analyzing the density of states and the electrostatic potentials of the layered electrode materials intercalated with cations. Combining with the electrochemical analysis, the specific capacity, cycle performance and CV response of the layered cathode materials in the presence of cations with different diameters can be obtained, obtaining relationship between the cationic diameter and the specific capacity and the cycle performance of the layered positive materials. As a consequence, a high-performance positive electrode system can be prepared through regulating the composition of the electrolytic solution.

The preparation of the layered manganese dioxide is described below.

0.948 g of potassium permanganate, 0.169 g of manganese sulfate and 120 ml of water are mixed in a beaker and stirred to obtain a clear solution, which is transferred into a 200 mL reactor and reacted at 160° C. under stirring for 12 h to obtain the layered manganese dioxide.

Several salt compounds varying in cationic diameter are selected and respectively dissolved with deionized water to obtain 0.5 mol/L lithium sulfate electrolytic solution, 0.5 mol/L sodium sulfate electrolytic solution, 0.5 mol/L potassium sulfate electrolytic solution, 0.5 mol/L rubidium sulfate electrolytic solution, 0.5 mol/L cesium sulfate electrolytic solution, 1 mol/L tetramethylammonium chloride (TMAC) electrolytic solution and 1 mol/L tetraethyl ammonium chloride (TEAC) electrolytic solution. A three-electrode system is constructed, in which the layered manganese dioxide is used as a positive electrode; an Ag/AgCl electrode is used as a reference electrode; and a platinum sheet is used as a counter electrode. The three-electrode system is respectively inserted in the above-prepared electrolytic solutions to test the electrochemical performance including the specific capacity, cycle performance and CV response characteristic, and the states of cations intercalated into the layered positive material are calculated.

The research results are presented below.

Figure 1B:
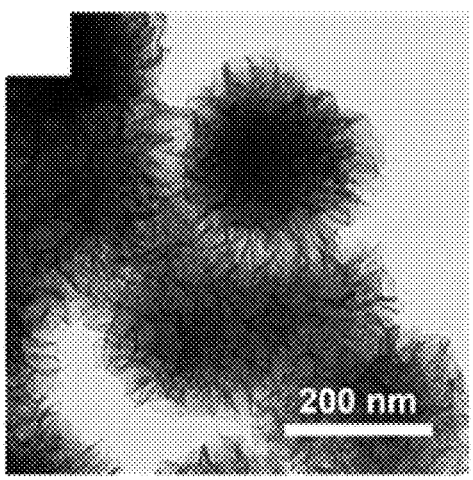
FIGS. 1b and 1c are TEM images of the layered manganese dioxide.
Figure 1C:
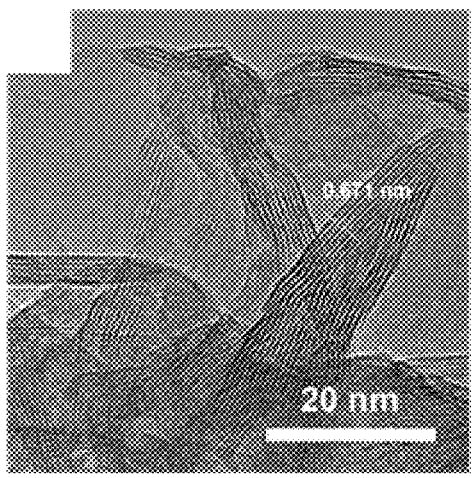
Figure 2:
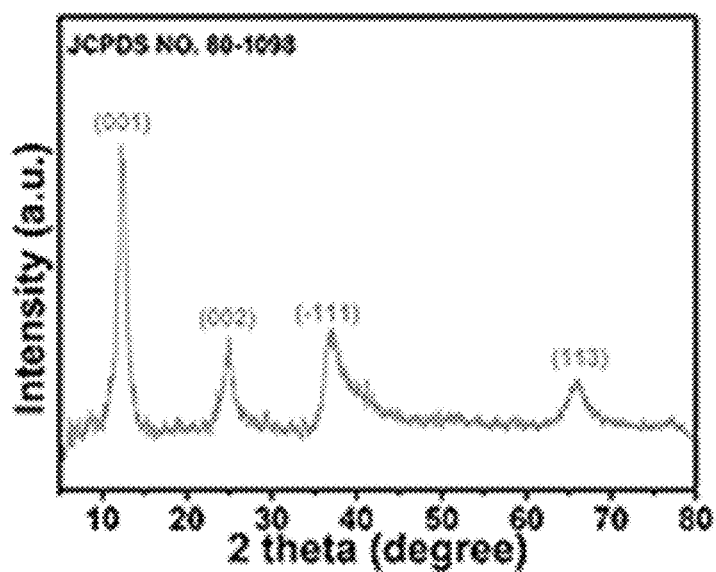
FIG. 2 is an XRD pattern of the layered manganese dioxide.
Figure 3A:
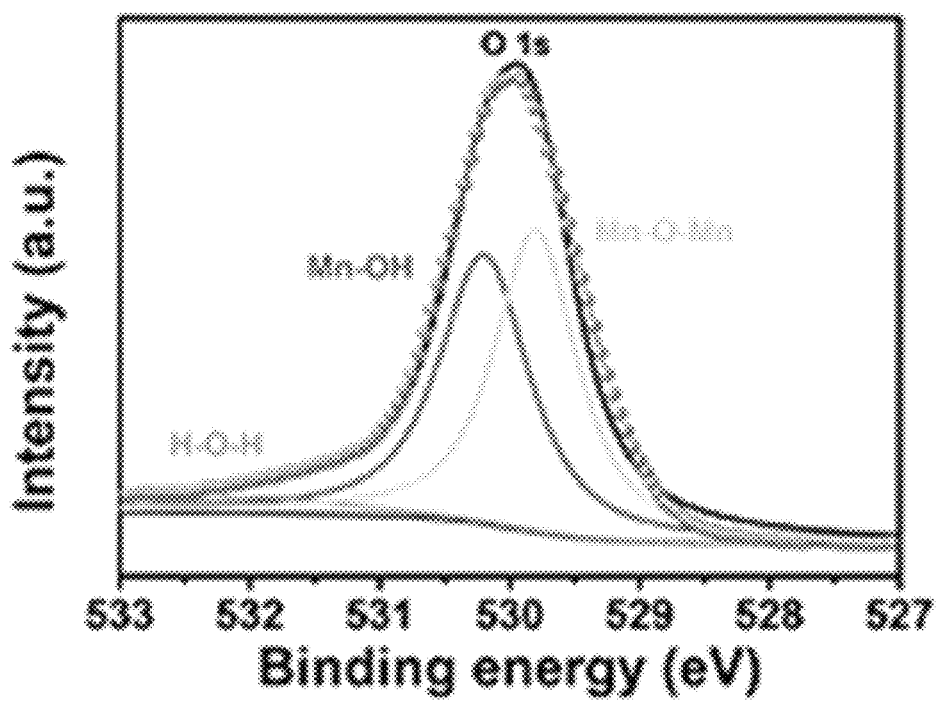
FIGS. 3a-b are XPS spectrums of the layered manganese dioxide.
Figure 3B:
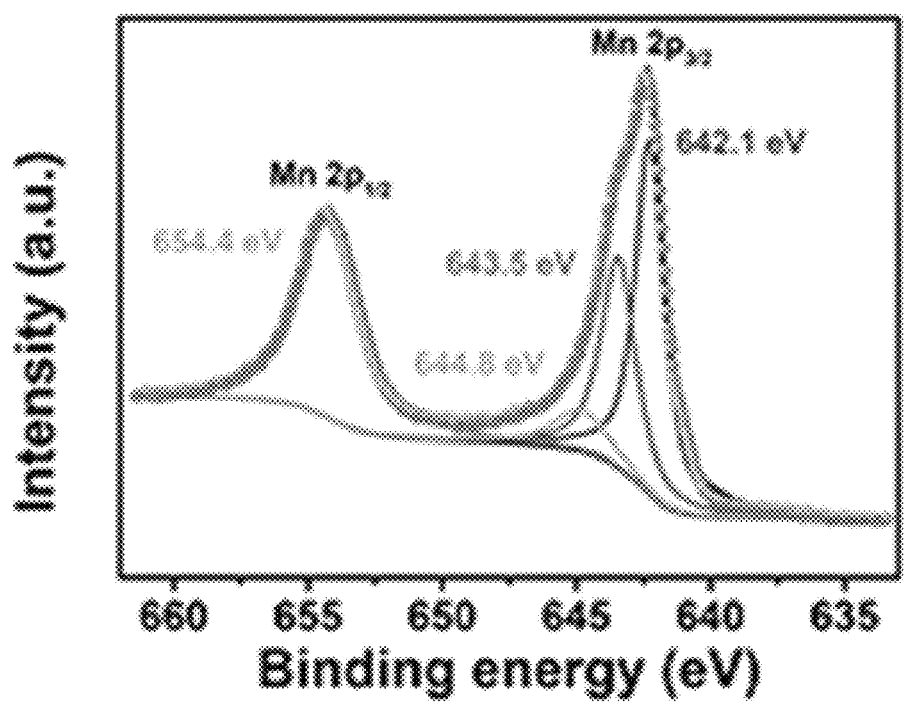
Figure 4A:
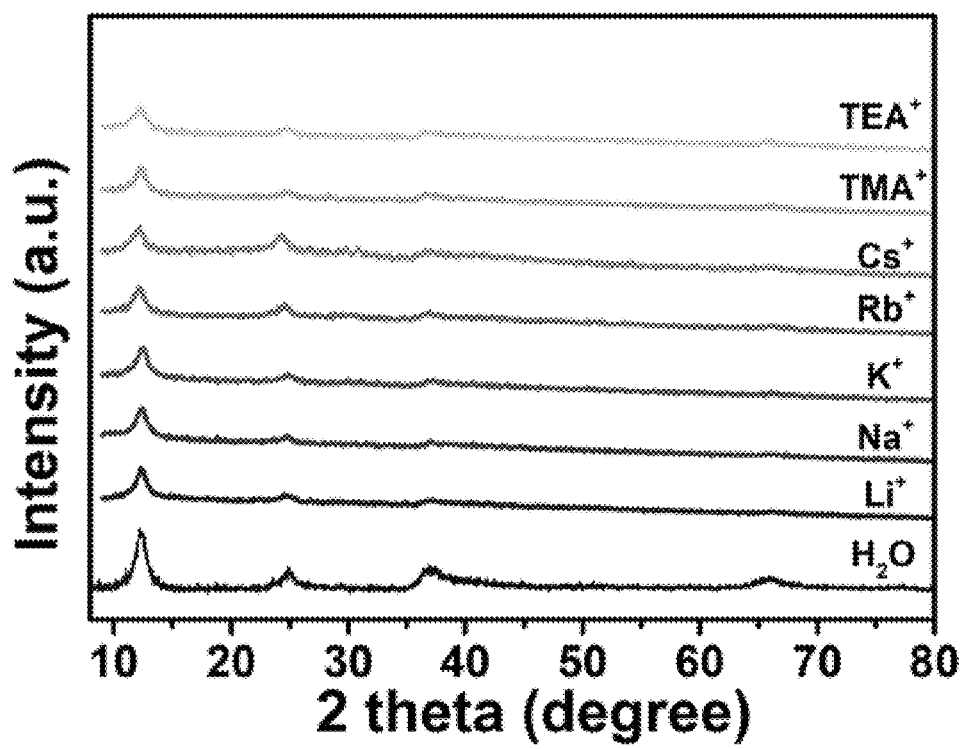
FIGS. 4a-d illustrates change of the interlayer spacing of the layered manganese dioxide in various electrolytic solutions after 100 cycles of charging and discharging.
Figure 4B:
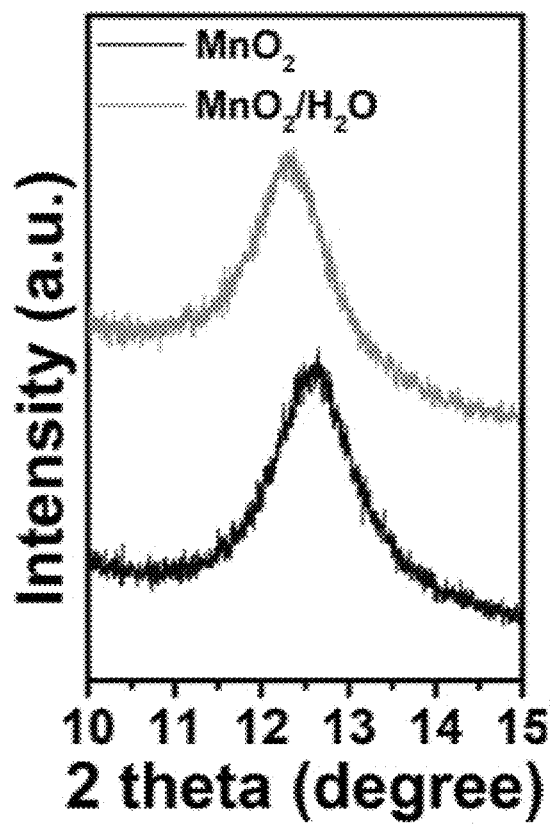
Figure 4C:
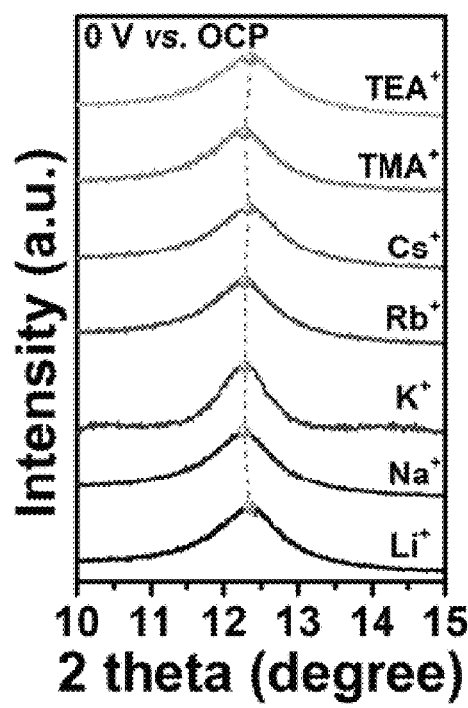
Figure 4D:
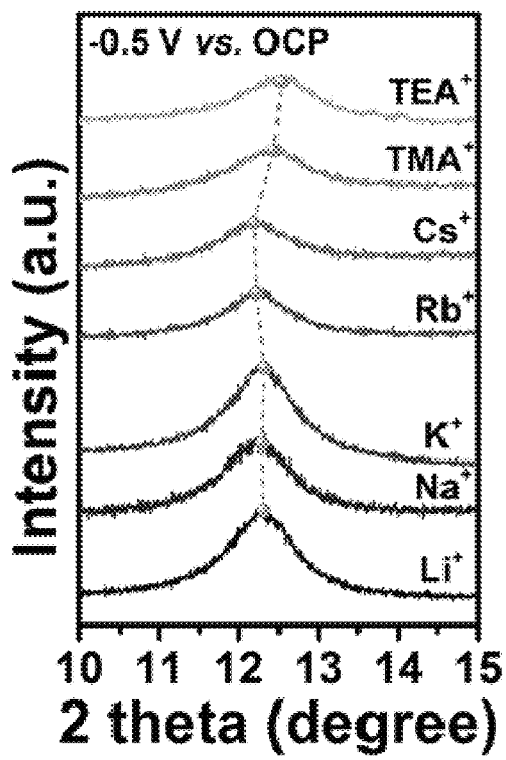
Figure 5:
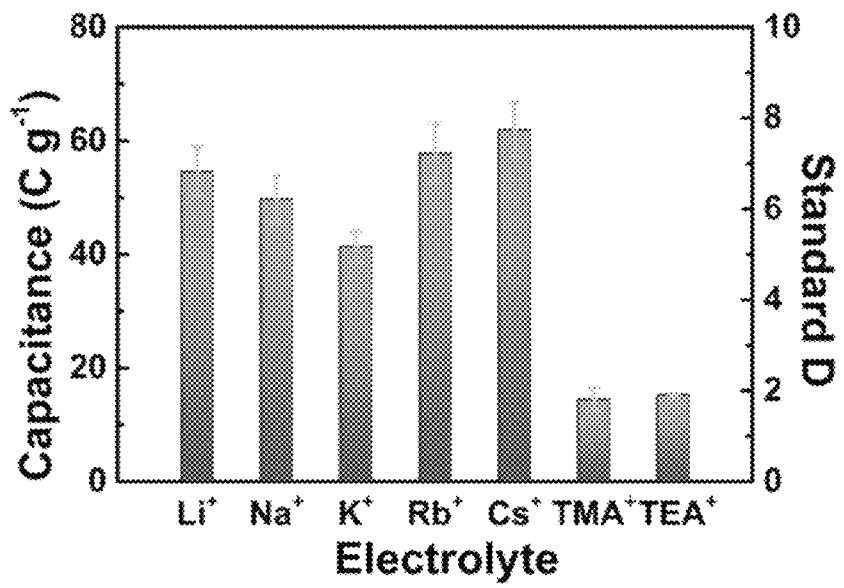
FIG. 5 shows the specific capacity of the layered manganese dioxide in various electrolytic solutions.
Figure 6:
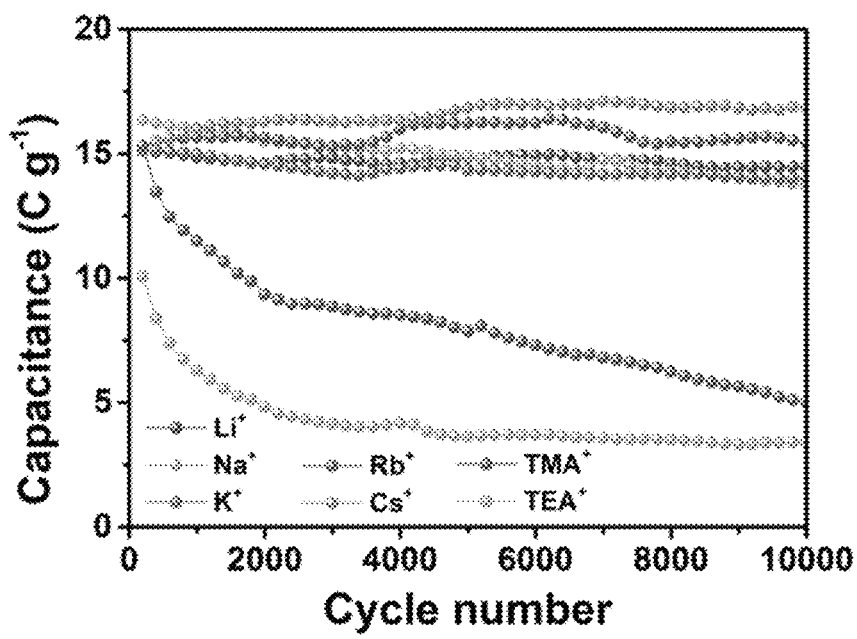
FIG. 6 shows the cycle performance of the layered manganese dioxide in various electrolytic solutions.
Figure 7A:
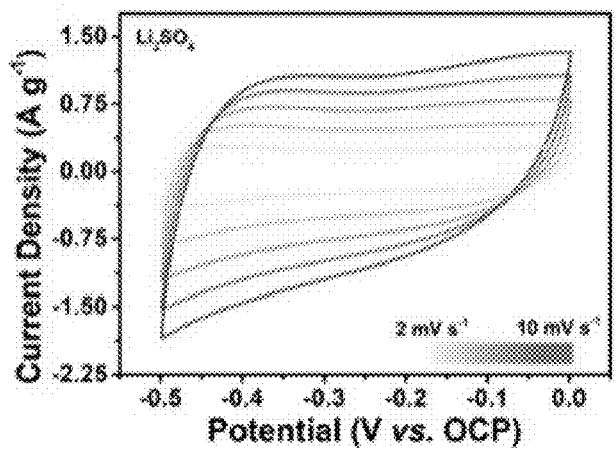
FIGS. 7a-h show a CV response characteristic of the layered manganese dioxide in various electrolytic solutions, where 7a: $Li_2SO_4$; 7b: $Na_2SO_4$; 7c: $K_2SO_4$; 7d: $Rb_2SO_4$; 7e: $Cs_2SO_4$; 7f: tetraethylammonium chloride (TEAC); 7g: tetramethylammonium chloride (TMAC); and 7h: comparison of the CV response characteristic in the presence of different salts.
Figure 7B:
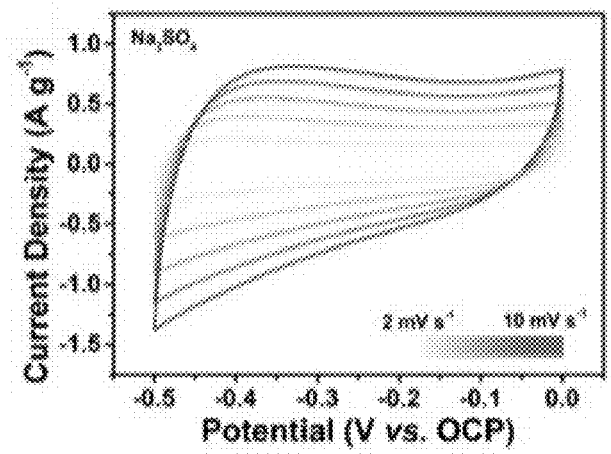
Figure 7C:
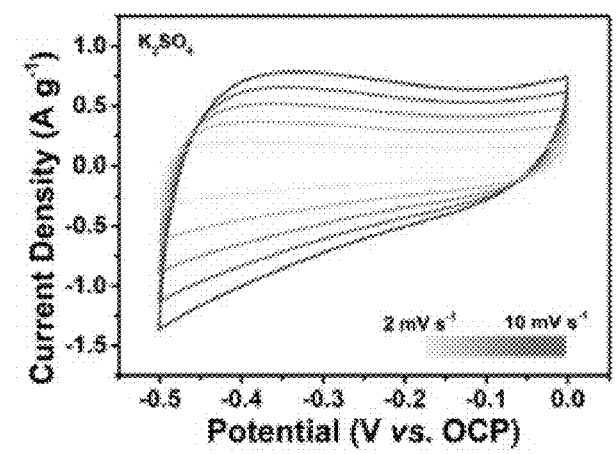
Figure 7D:
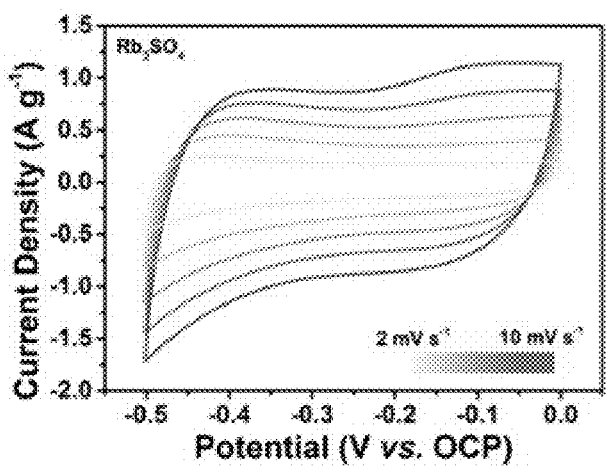
Figure 7E:
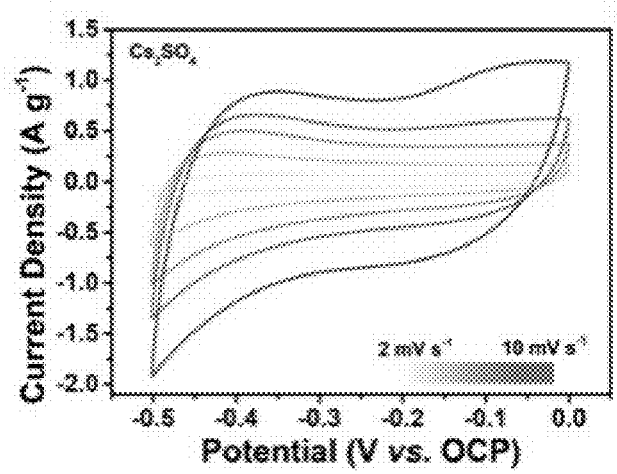
Figure 7F:
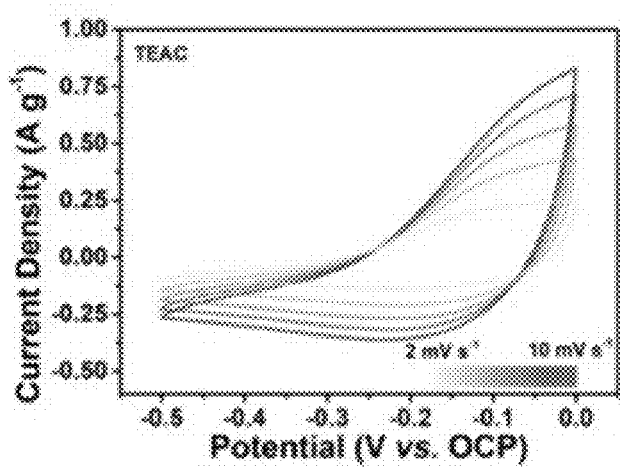
Figure 7G:
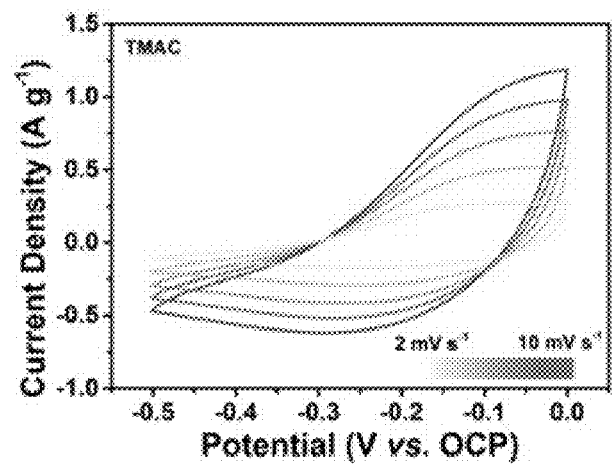
Figure 7H:
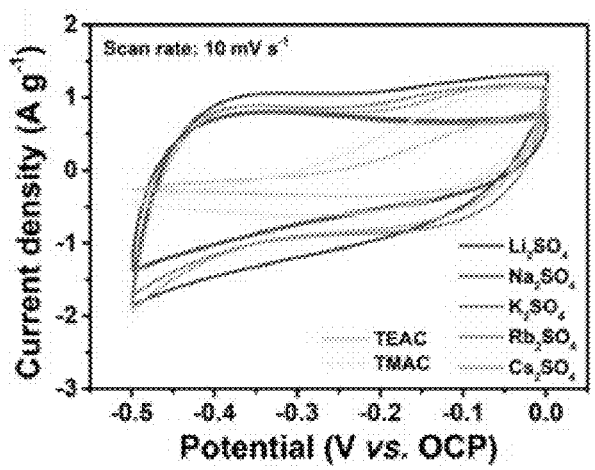
Figure 8A:
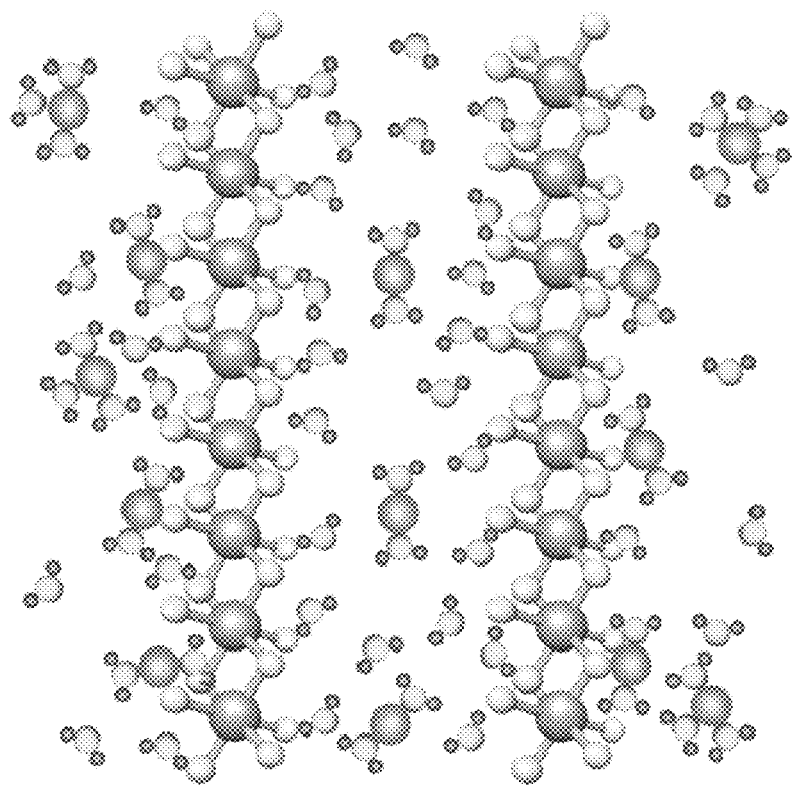
FIGS. 8a-c schematically illustrates the intercalation of cations with different diameters into the layered manganese dioxide.
Figure 8B:
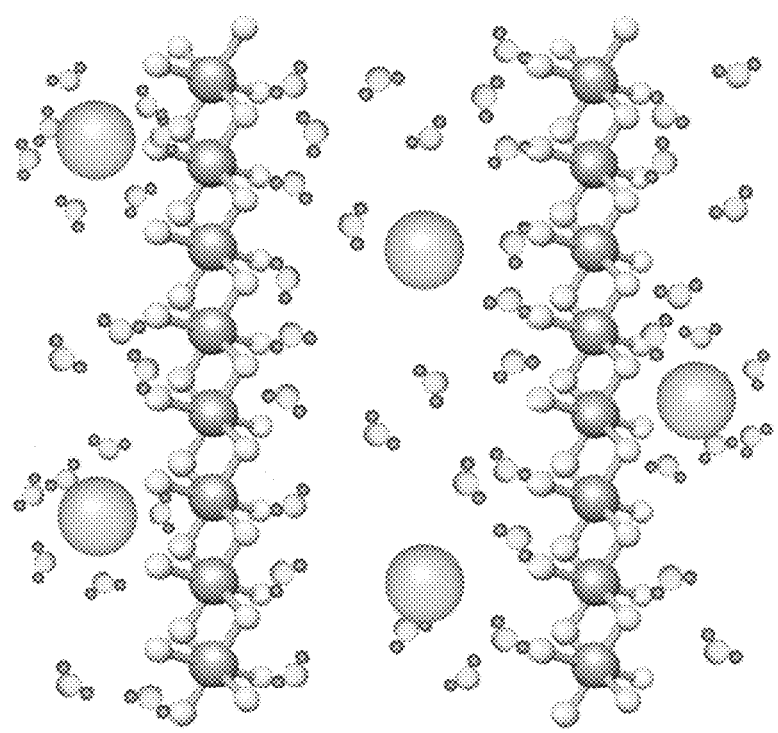
Figure 8C:
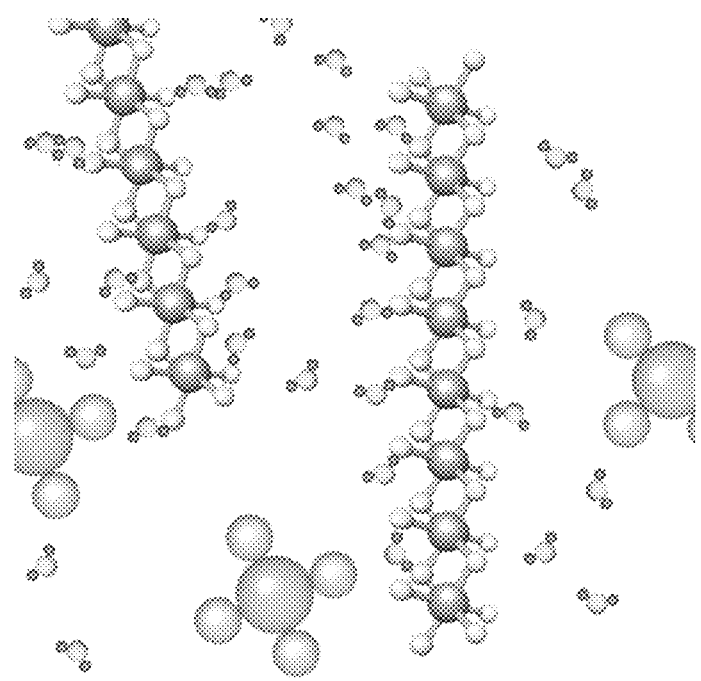
Figure 9A:
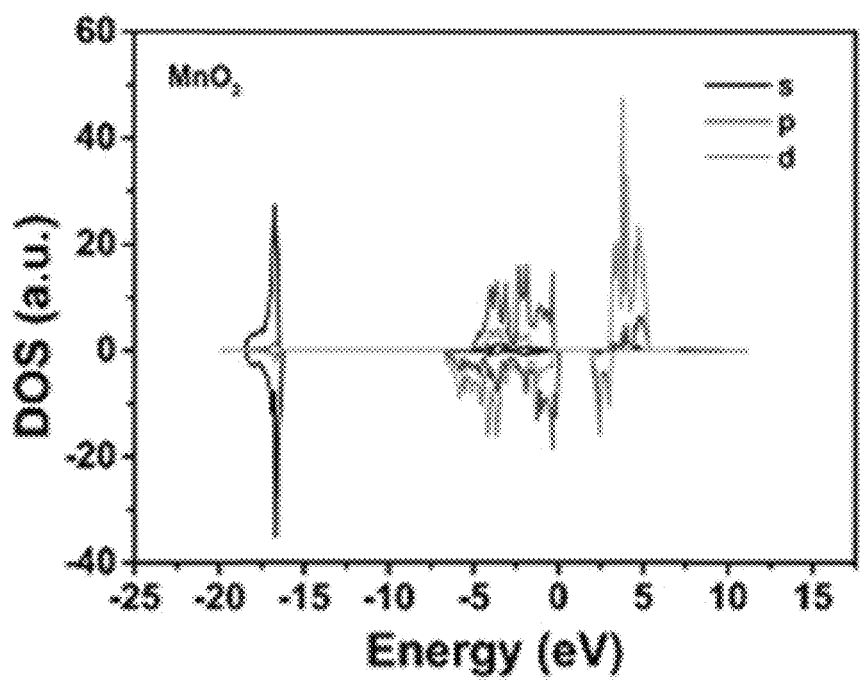
FIGS. 9a-f show change of the density of states of the layered manganese dioxide in the presence of different intercalated cations, where 9a: control; 9b: $Li_2SO_4$; 9c: $Na_2SO_4$; 9d: $K_2SO_4$; 9e: $Rb_2SO_4$; and 9f: $Cs_2SO_4$.
Figure 9B:
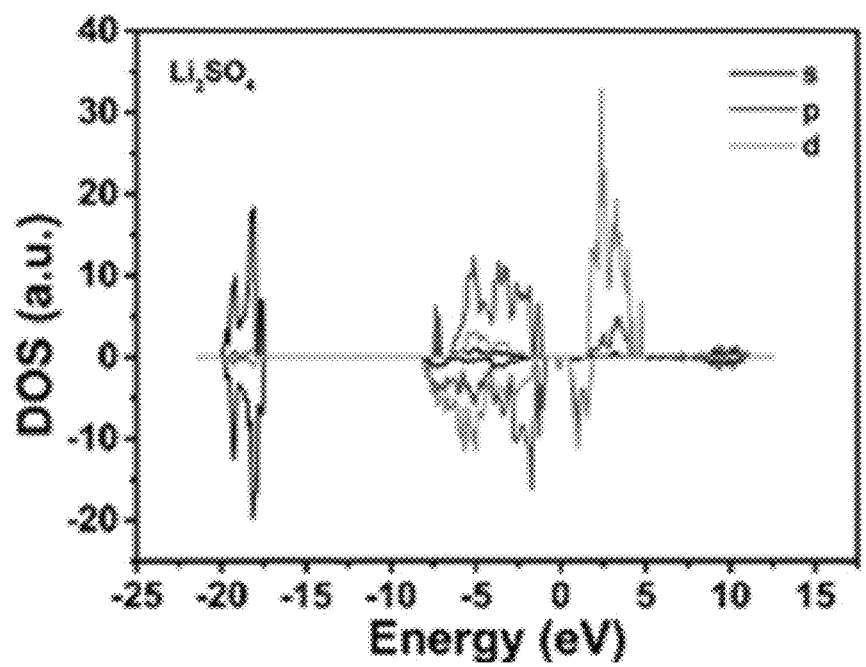
Figure 9C:
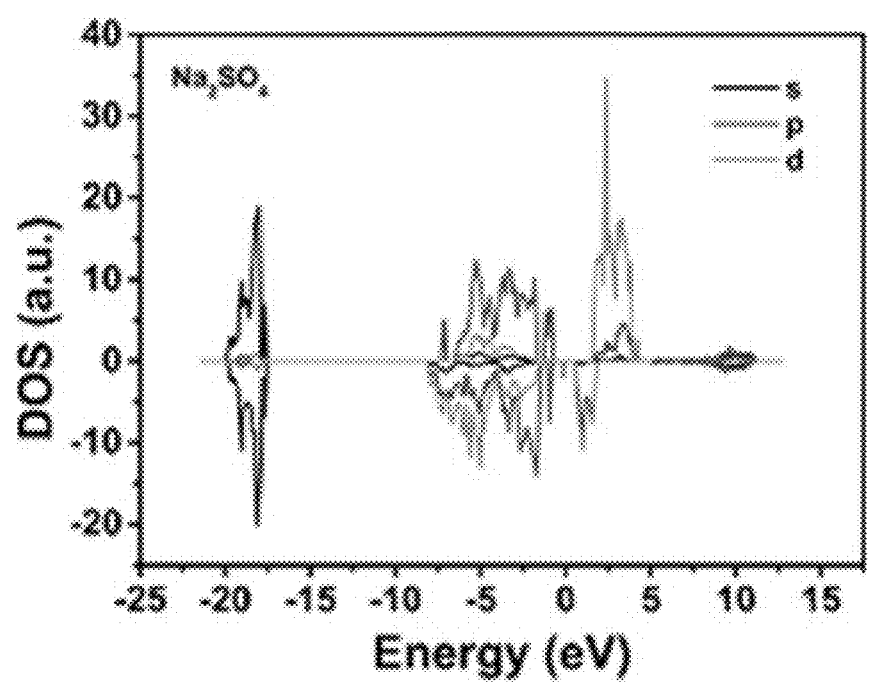
Figure 9D:
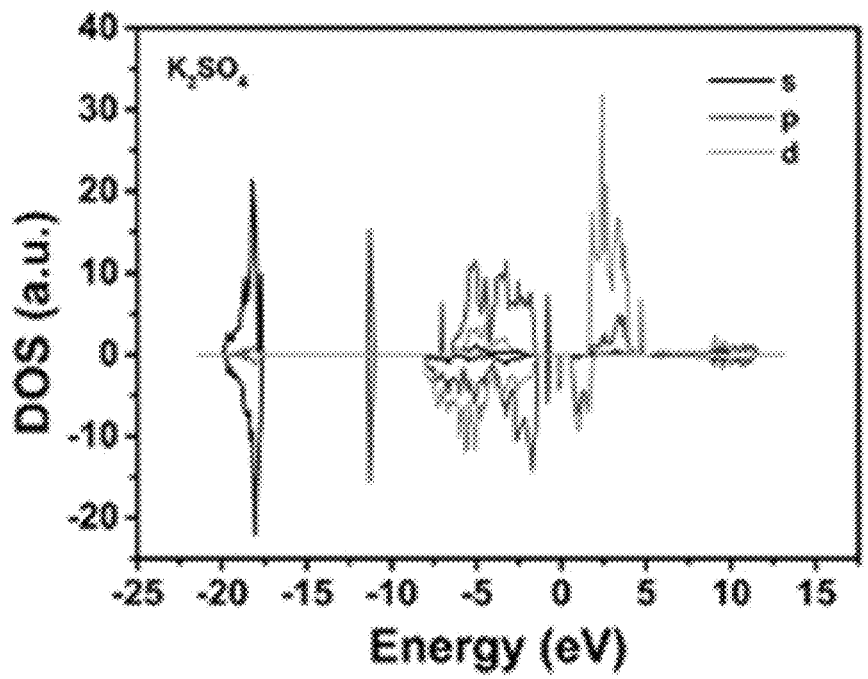
Figure 9E:
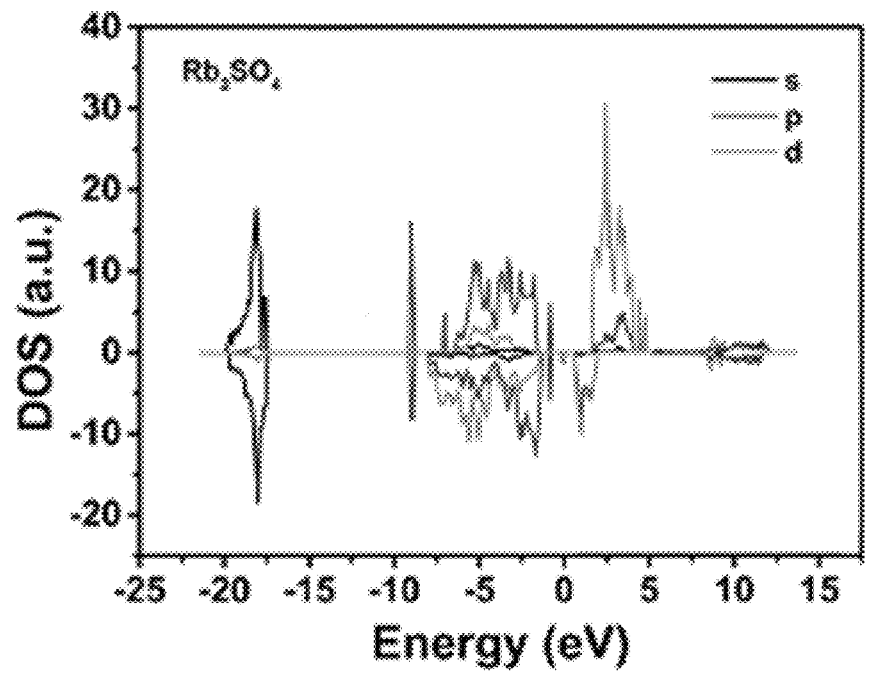
Figure 9F:
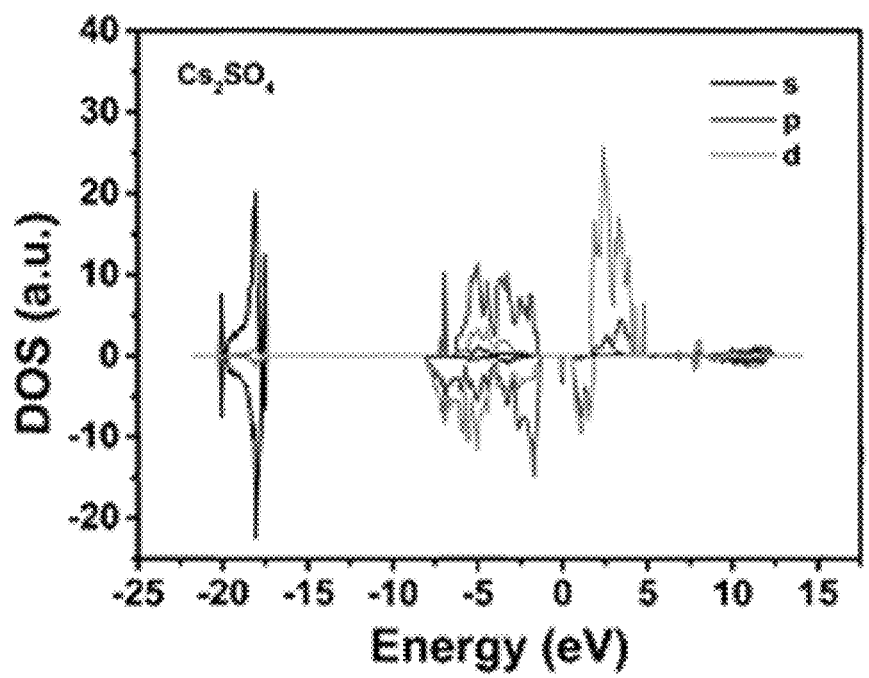

(1) Surface Morphology and Structural Characteristics of the Layered Manganese Dioxide As shown in FIGS. 1a-c, the layered manganese dioxide has a layered structure composed of irregular sheets, which belongs to a nano-scale material and shows good crystallinity. It can be seen from FIG. 1c that the interlayer spacing of the layered manganese dioxide is about 0.671 nm. It can be seen from FIG. 2 that there are two obvious characteristic diffraction peaks of the layered manganese dioxide at 2θ of 12.2° and 24.7°. FIGS. 3a-b show the valence composition in the layered manganese dioxide.

(2) Specific Capacity, Cycle Performance and CV Response of the Layered Manganese Dioxide Referring to FIGS. 4a-4d, 5-6 and 7a-7h, it can be seen that the specific capacities of the layered manganese dioxide in electrolytic solutions containing different cations are arranged in an order of $Cs^+>Rb^+>Li^+>Na^+>K^+>TEA^+>TMA^+$. As shown in FIGS. 4a-4d and FIG. 6, during the charging and discharging cycle of the layered manganese dioxide in different electrolytic solutions, the intercalation and de-intercalation of small-diameter cations, including $Li^+$, $Na^+$, and $K^+$, do not change the lattice spacing of the layered manganese dioxide, leading to an excellent cycle performance; by contrast, the intercalation and de-intercalation of those cations with a relatively large diameter, including $Cs^+$ and $Rb^+$, will change the lattice spacing of the layered manganese dioxide to a certain extent, but this change in the lattice spacing is reversible during the process, also leading to a good cycle performance. With regard to the cations with an extra-large diameter including $TEA^+$ and $TMA^+$, their intercalation and de-intercalation will damage the crystal structure of the layered manganese dioxide, attenuating the cycle performance. As shown in FIGS. 7a-7h, the intercalation and de-intercalation of alkaline metal cations present a a rectangular-like CV response, which belongs to typical pseudocapacitance reactions, indicating a good cycle performance of the layered manganese dioxide. By comparison, the CV response characteristics of $TEA^+$ and $TMA^+$ are poor since $TEA^+$ and $TMA^+$ cannot be intercalated into and de-intercalated out of the layered manganese dioxide normally, resulting in unstable cycle performance.

(3) Mechanism of Intercalation and Deintercalation of Different Cations Into/Out of the Layered Manganese Dioxide Referring to FIGS. 8a-8c, 9a-9f, 10 and 11a-11f, during the intercalation and de-intercalation processes, small-diameter cations, including $Li^+$, $Na^+$, and $K^+$, will not change the lattice spacing of the layered manganese dioxide, but the solvent molecules will be co-intercalated into the layered manganese dioxide owing to the large difference between the cationic diameter and the interlayer spacing; large-diameter cations, including Cs+ and Rb+, will reversibly change the lattice spacing of the layered manganese dioxide to a certain extent, and it is difficult for water molecules to co-intercalate into the layered manganese dioxide owing to the small difference between the cationic diameter and the interlayer spacing, allowing for an enhanced desolvation effect; and extra-large diameter cations, including $TEA^+$ and $TMA^+$, have relatively large difficulty in intercalating into the layered structure and will damage the structure of the layered manganese dioxide.

Figure 10:
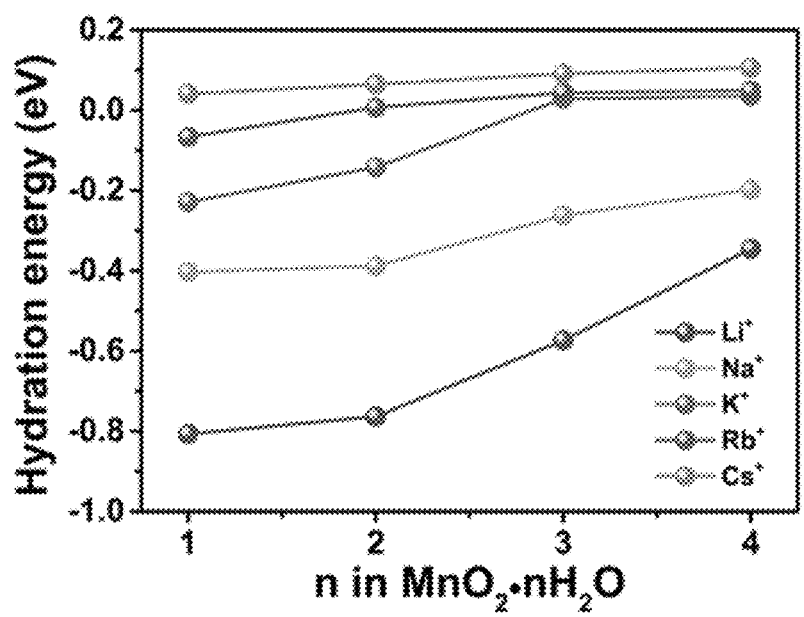
FIG. 10 shows a relationship curve between the hydration energy of the layered manganese dioxide and the number of hydrated molecules in the presence of different intercalated cations.
Figure 11A:
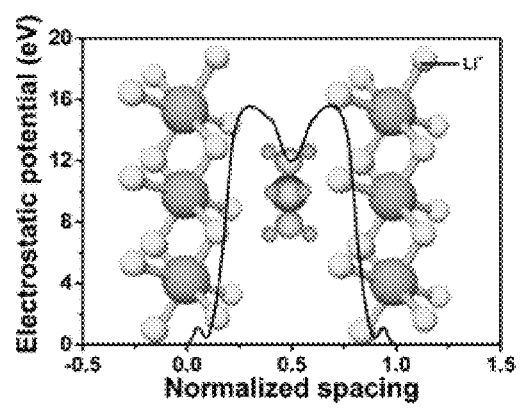
FIGS. 11a-f shows state and electrostatic potential of the layer manganese dioxide after different cations are intercalated, 11a: Li+; 11b: Na+; 11c: K+; 11d: Rb+; 11e: Cs+; and 11f: comparison of the electrostatic potential in the presence of different cations.
Figure 11B:
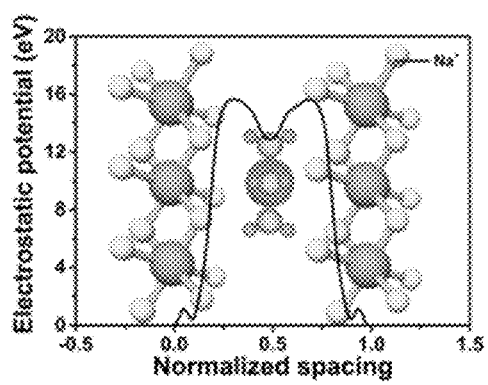
Figure 11C:
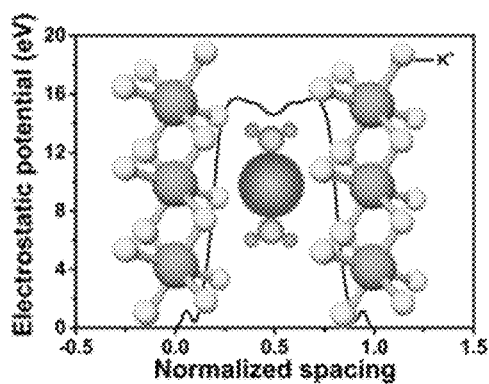
Figure 11D:
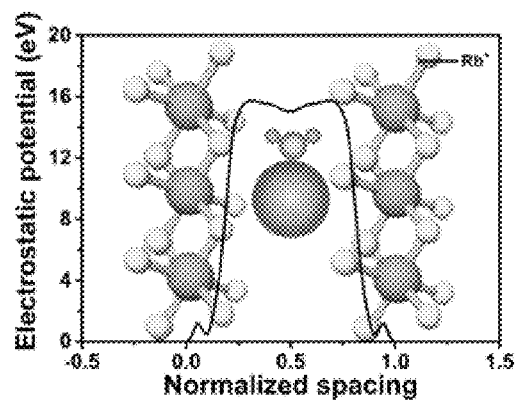
Figure 11E:
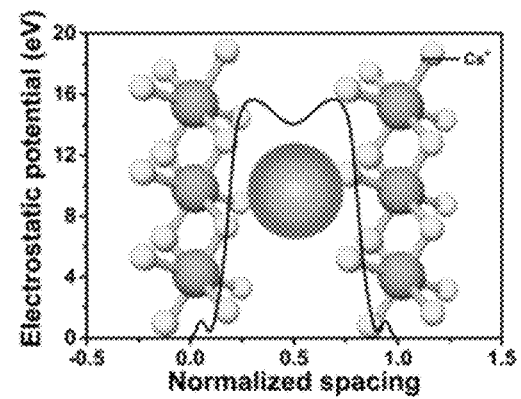
Figure 11F:
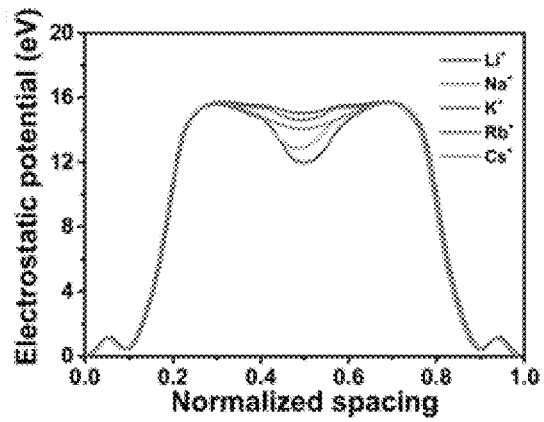

The Kohn-Sham equation is solved in the frame of Density Functional Theory by using the Vienna Ab-initio Simulation Package (VASP) to obtain the ionic state, the density of state and electrostatic potential of the cations intercalated into the layered electrode material. In the intercalation and de-intercalation processes of large-diameter cations, the interlayer interaction and electrostatic force are great, and the DOS of the material surface is induced to change, leading to a sudden change in the performance of the layered electrode material. As shown in FIG. 10, the number of co-intercalated water molecules is 4, 4, 2, 1 and 0, respectively, during the intercalation of $Li^+$, $Na^+$, $K^+$, $Rb^+$ and $Cs^+$ into the layered manganese dioxide, which indicates that with the increase of the cationic diameter, the number of co-intercalated water molecules decreases. It is because that the difference between the diameter of the large-diameter cations and the interlayer spacing is relatively small, the remaining space can hardly accommodate the water molecules, so the desolvation effect is enhanced.

Figure 12:
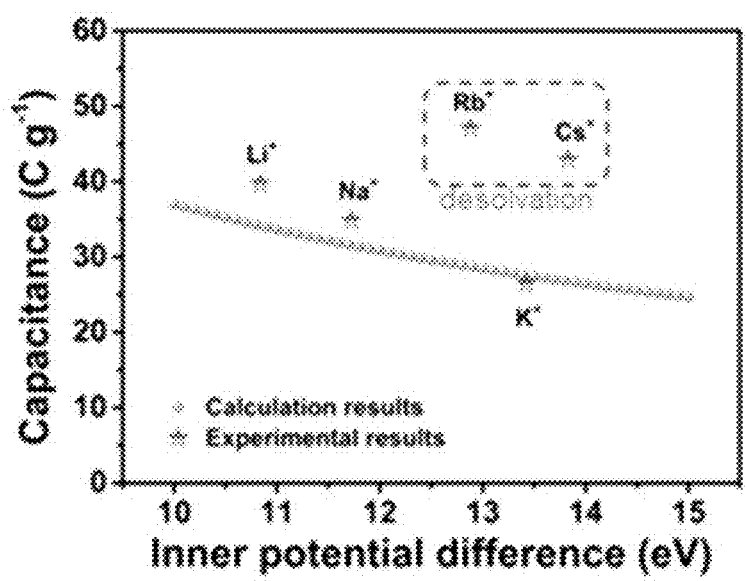
FIG. 12 shows the relationship between the interlayer static potential and the specific capacity of the layer manganese dioxide after the intercalation of different cations.
Figure 13:
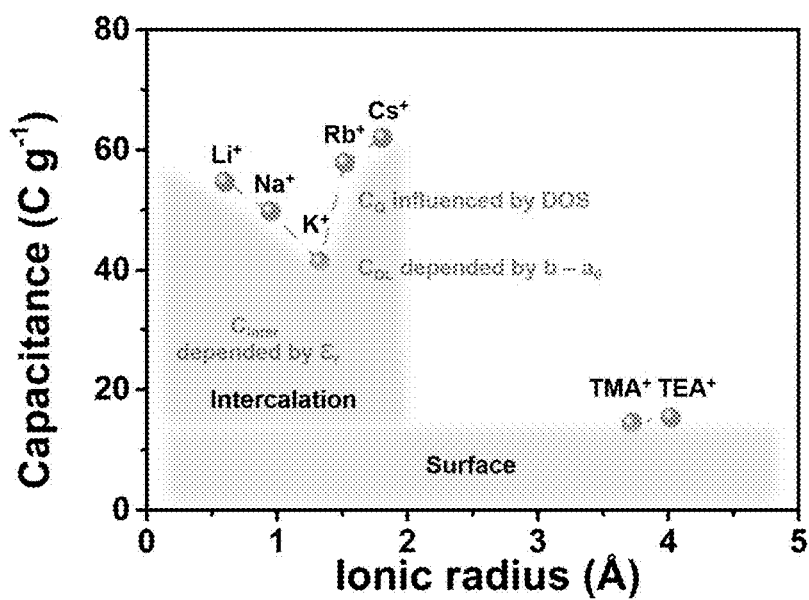
FIG. 13 shows the effect of the diameter of intercalated cations on the specific capacity of the layer manganese dioxide.
Figure 14:
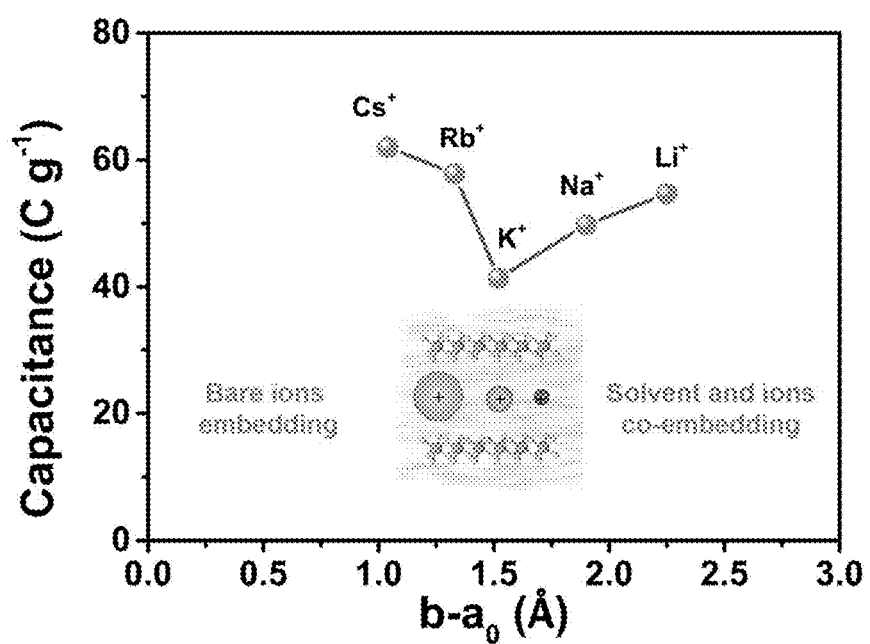
FIG. 14 shows the effect of the difference between the interlayer spacing of layered manganese dioxide and the diameter of hydrated cations on the specific capacity of the layer manganese dioxide.

In terms of capacity, it can be provided by the redox reaction and the intercalation and absorption of ions. When the work function of the material is large, the capacity is mainly provided by the intercalation and surface adsorption energy. When the work function of the material is small, the capacity is mainly provided by the redox reaction. In this disclosure, the primary research object is the capacity provided by intercalation. Referring to FIGS. 12-14 (in FIG. 14, the horizontal coordinate is layer spacing b, and $a_0$ represents the diameter of intercalated hydrated cation), combining with the above-mentioned specific capacity and cycle performance of the layered electrode materials in electrolytic solutions containing different cations, the relationship between specific capacity and cycle performance of the layered electrode material and cationic diameter is concluded. In summary, in the presence of water molecules, the capacity decreases with the increase of the ionic diameter, but the desolvation effect can dramatically increase the capacity of the layered electrode materials. When the cationic diameter is small, the desolvation effect is slight, and at this time, the capacity decreases with the increase of the cationic diameter, which is mainly explained by that the nonlinear effect on the dielectric constant brought by the hydration water on the surface of the hydrated ions causes that the classic capacitance calculation formula is not applicable, and the dielectric constant needs to be corrected, which ultimately leads to a reduction in the capacity. Due to the large diameter of $Rb^+$ and $Cs^+$, the desolvation effect is obvious, so that the dielectric constant tends to stable, and the interlayer electrostatic force is large, leading to a large capacity. Therefore, reducing the solvation effect in the intercalation and de-intercalation of cations can effectively prevent the intercalation of solvent molecules, facilitating improving the specific capacity and cycle performance of the layered materials. According to the above results, it can be seen that when the diameter of solvent molecules is larger than the difference between the layer spacing and the cationic diameter, solvent molecules are difficult to intercalate between the layers. Thus, the desolvation effect can be achieved by regulating the layer spacing, cationic diameter, and the solvent molecular diameter, which can facilitate improving the specific capacity and cycle performance of the layered electrode materials.

To this end, a method is provided herein for improving the performance of a layered electrode material, which is specifically described as follows.

(S1) A interlayer spacing of the layered electrode material is measured and denoted as b.

In an embodiment, the layered electrode material is selected from the group consisting of nickel-based layered materials, titanium-based layered materials, cobalt-based layered materials, manganese-based layered materials, graphene, and graphene derivatives.

In an embodiment, the layered electrode material is selected from the group consisting of layered manganese dioxide, layered lithium cobalt oxide, layered lithium nickel oxide, layered lithium manganese oxide, layered lithium nickel manganese oxide, layered titanium carbide, and graphene.

In an embodiment, the layer spacing is measured by XRD, SEM, transmission electron microscopy, or a combination thereof.

(S2) A salt compound is added into a solvent with a molecular diameter of c to prepare an electrolyte, where a diameter of a cation in the salt compound is a which is less than the layer spacing b.

In an embodiment, the salt compound is selected from the group consisting of sulphate, phosphate, carbonate, nitrate and chloride of a metallic cation and ammonium ion, quaternary ammonium salt, and a combination thereof.

In an embodiment, the metallic cation is selected from the group consisting of lithium ion, sodium ion, potassium ion, niobium ion, cesium ion and a combination thereof; and the quaternary ammonium salt is tetramethylammonium chloride, tetraethylammonium chloride, or a combination thereof.

In an embodiment, the salt compound is a mixture, and a diameter of a cation in any one of salts in the mixture satisfies c>b−a.

In an embodiment, the solvent is water, an organic solvent, or a mixture thereof.

In an embodiment, the organic solvent is selected from the group consisting of carbonate, acetonitrile, dimethyl sulfoxide, 1,4-butyrolactone, dimethyl tetrahydrofuran, tetrahydrofuran, 1,3-dioxycyclopentane, 1,2-dimethoxyethane and a combination thereof.

In an embodiment, the carbonate is selected from the group consisting of vinyl carbonate, propylene carbonate, 2,3-butylene carbonate, dimethyl carbonate, diethyl carbonate, dipropyl carbonate, dibutyl carbonate, methyl ethyl carbonate and a combination thereof.

In an embodiment, the solvent is a mixture, and a molecular diameter c of any one of a solvent in the mixture satisfies c>b−a.

In an embodiment, the concentration of the electrolyte in step (S2) is 0.2-1 mol/L.

It should be noted that the electrolyte prepared herein further includes an additive commonly used in the art.

(S3) The solvent molecular diameter c and the cationic diameter a in the electrolyte satisfy c>b−a, and the electrolyte obtained in step (S2) is applied as a working electrolyte for the layered electrode material to improve the specific capacity and cycle performance.

When the solvent molecular diameter c and the cationic diameter a in the working electrolyte satisfy c>b−a, it shows that the remaining space between layers is not enough to accommodate the solvent molecules, so the desolvation effect is strong, and the capacity and cycle performance of the material are improved accordingly.

EXAMPLE 1

Provided herein was a method for improving the performance of a layered electrode material, which was specifically described as follows.

(S1) A layered manganese dioxide was prepared through the above-mentioned method and used as a positive electrode material, where an interlayer spacing of the layered manganese dioxide was 0.671 nm.

(S2) Cesium sulfate with a radius of 0.167 nm was added into water to prepare an electrolytic solution with a concentration of 0.5 mol/L, where the diameter (a=0.334 nm) of cesium ions and the diameter (c=0.4 nm) of water molecules satisfied c>b−a.

(S3) The electrolyte was used as the working electrolyte for the layered manganese dioxide, which can significantly improve the specific capacity and cycle performance of the layered manganese dioxide.

COMPARATIVE EXAMPLES 1-3

The methods provided in Comparative Examples 1-3 were different from the method in Example 1 in the composition of the electrolytic solution (listed in Table 1).

TABLE 1

Composition of electrolytic solutions in Example 1 and
Comparative Example 1-3 and performance testing results

| Samples | Cationic salt | Solvent | Specific capacity (C/g) | Capacity retention rate after 10000 cycles (%) |
|---|---|---|---|---|
| Example 1 | Cesium sulfate | Water | 62.0 | 108.7 |
| Comparative Example 1 | Lithium sulfate | Water | 54.6 | 95.6 |
| Comparative Example 2 | Sodium sulfate | Water | 47.8 | 84.0 |
| Comparative Example 3 | Potassium sulfate | Water | 41.4 | 92.3 |

As shown in Table 1, with respect to Example 1, as the water molecular diameter was greater than the difference between the interlayer spacing and the diameter of cesium ion, it was difficult for water molecules to intercalate between the layers, and the interaction between cesium ions in the interlayer and the layered manganese dioxide was significantly enhanced, resulting in a high capacity. Surprisingly, the capacity retention rate of the layered material in Example 1 even reached 108.7% after 10000 cycles, which may ascribe to the activation effect of cesium ions on the layered manganese dioxide. However, in Comparative Example 1-3, as the water molecular diameter was smaller than the difference between the interlayer spacing and the cationic diameter, the specific capacities were significantly lower than that in Example 1, which was because that in the presence of a salvation shell, as the cation size increases, the size of the solvated ion also increases, leading to a lower capacity. By comparison, after 10000 cycles, there is no significant decline in the capacity, which was explained by that the intercalation and deintercalation of hydrated ions did not significantly affect the layer spacing, and did not lead to the structural collapse, so the capacity retention rate was relatively high after 10000 cycles.

EXAMPLE 2 AND COMPARATIVE EXAMPLES 4-6

The methods provided in Example 2 and Comparative Examples 1-3 were different from the method in Example 1 in the layered material in step (S1) and the composition of electrolytic solution in step (S2) (listed in Table 2).

TABLE 2

Composition of electrolytic solutions in Example 2 and
Comparative Examples 4-6 and performance testing results

| Samples | Layered electrode material | Interlayer spacing (nm) | Salt | Solvent | Specific capacity (C/g) | Capacity retention rate after 10000 cycles (%) |
|---|---|---|---|---|---|---|
| Example 2 | Titanium carbide | 1.4 | LiTFSI | PC | 468 | 94% |
| Comparative Example 4 | Titanium carbide | 1.4 | $Li_2SO_4$ | $H_2O$ | 82.1 | — |
| Comparative Example 5 | Titanium carbide | 1.4 | LiTFSI | ACN | 242 | — |
| Comparative Example 6 | Titanium carbide | 1.4 | LiTFSI | DMSO | 273 | — |

As shown in Table 2, the effect of solvent on the performance of the layered material was significant when the interlayer spacing and cation were kept the same. As for titanium carbide, its interlayer spacing was 1.4 nm, which was enough for the intercalation and deintercalation of hydrated Li-ions. Due to the thick salvation shell, the interaction between Li ions and titanium carbide was relatively weak, leading to poor performance. In the electrolyte systems of DMSO (dimethyl sulfoxide) and ACN (acetonitrile), the solvent molecules can intercalate between the layers, but as solvent molecules were larger than water molecules, the degree of solvation was low, leading to the enhanced force between Li ions and titanium carbide. With regard to PC (acrylic carbonate), a diameter of the solvent molecule was larger than the interlayer spacing, so they could not intercalate into layers, and the interaction between Li ions in the interlayer and the titanium carbide was significantly enhanced, resulting in a high capacity and a high capacity retention rate of 94% after 10000 cycles.

In summary, in the method provided herein, the interlayer spacing of the layered electrode material is measured, and then an appropriate solvent and salt compound are selected to prepare an electrolyte on the premise that the solvent molecular diameter is larger than the difference between the interlayer spacing and the cationic diameter. The above electrolyte is the optimal working electrolyte for the layer electrode material, ensuring a high capacity and good cycle stability during the charging and discharging processes. Therefore, only by regulating the diameters of cations and solvent molecules, the optimal electrolytic solution can be prepared for any one of the layered electrode materials, thus improving the specific capacity and cycle performance of the layered electrode material. This method has good universality, and can significantly improve the application value of the layered materials.

Described above are merely preferred embodiments of the application, and are not intended to limit the application. Various replacements and changes made by those skilled in the art without departing from the spirit of the application should fall within the scope of the application defined by the appended claims.

What is claimed is:
1. A method for improving performance of a layered electrode material, comprising:
   (S1) measuring an interlayer spacing b of the layered electrode material;

(S2) adding a salt compound into a solvent with a molecular diameter of c to prepare an electrolyte; wherein a diameter of a cation of the salt compound is a; and c>b−a; and (S3) applying the electrolyte obtained in step (S2) as a working electrolyte for the layered electrode material to improve specific capacity and cycle performance of the layered electrode material.

2. The method of claim 1, wherein the salt compound in the step (S2) is selected from the group consisting of sulphate, phosphate, carbonate, nitrate and chloride of a metallic cation and ammonium ion, a quaternary ammonium salt and a combination thereof.

3. The method of claim 2, wherein the metallic cation is selected from the group consisting of lithium ion, sodium ion, potassium ion, niobium ion, cesium ion and a combination thereof; and the quaternary ammonium salt is tetramethylammonium chloride, tetraethylammonium chloride or a combination thereof.

4. The method of claim 1, wherein the solvent in step (S2) is water, an organic solvent or a mixture thereof.

5. The method of claim 4, wherein the organic solvent is selected from the group consisting of carbonate, acetonitrile, dimethyl sulfoxide, 1,4-butyrolactone, dimethyl tetrahydrofuran, tetrahydrofuran, 1,3-dioxycyclopentane, 1,2-dimethoxyethane and a combination thereof.

6. The method of claim 5, wherein the carbonate is selected from the group consisting of vinyl carbonate, propylene carbonate, 2,3-butylene carbonate, dimethyl carbonate, diethyl carbonate, dipropyl carbonate, dibutyl carbonate, methyl ethyl carbonate and a combination thereof.

7. The method of claim 1, wherein a concentration of the electrolyte in step (S2) is 0.2-1 mol/L.

8. The method of claim 1, wherein the layered electrode material is selected from the group consisting of a nickel-based layered material, a titanium-based layered material, a cobalt-based layered material, a manganese-based layered material, graphene and a graphene derivative.

9. The method of claim 8, wherein the layered electrode material is selected from the group consisting of layered manganese dioxide, layered lithium cobalt oxide, layered lithium nickel oxide, layered lithium manganese oxide, layered lithium nickel manganese oxide, layered titanium carbide and graphene.

10. The method of claim 8, wherein in step (S1), the interlayer spacing of the layered electrode material is measured by X-ray diffraction (XRD), scanning electron microscopy (SEM), transmission electron microscopy (TEM), or a combination thereof.

* * * * *